United States Patent [19]
Haddad, Jr.

[11] Patent Number: 5,806,911
[45] Date of Patent: Sep. 15, 1998

[54] TRUCK COVER ASSEMBLY HAVING FLOW DIVIDER/COMBINER HYDRAULIC CIRCUIT

[75] Inventor: Edward N. Haddad, Jr., Worcester, Mass.

[73] Assignee: Pioneer Consolidated Corporation, North Oxford, Mass.

[21] Appl. No.: 757,128

[22] Filed: Dec. 3, 1996

[51] Int. Cl.$^6$ ........................................ B60P 7/02
[52] U.S. Cl. .......................................... 296/100.14
[58] Field of Search .................. 296/101, 100, 296/136, 183, 184

[56] References Cited

U.S. PATENT DOCUMENTS

| | | | |
|---|---|---|---|
| 4,148,517 | 4/1979 | Smith | 296/183 |
| 4,427,231 | 1/1984 | Smith | 296/183 |
| 4,673,208 | 6/1987 | Tsukamoto | 296/100 |
| 4,874,196 | 10/1989 | Goldstein et al. | |
| 5,238,287 | 8/1993 | Haddad, Jr. | |
| 5,340,187 | 8/1994 | Haddad, Jr. | |

*Primary Examiner*—Stephen Avila
*Attorney, Agent, or Firm*—Weingarten, Schurgin, Gagnebin & Hayes LLP

[57] ABSTRACT

An hydraulic circuit for operating a truck cover assembly incorporates a flow divider/combiner which puts pairs of hydraulic actuators back into synchronization. The cover assembly is operable by pairs of hydraulic actuators. A hydraulic three-position, four-way valve is provided for each pair of actuators. In a first position, the valve allows hydraulic fluid to flow to each actuator of the pair through a flow divider/combiner. The flow divider/combiner includes a cross-over pressure relief valve and a divider/combiner section. The divider/combiner section divides the flow generally equally on lines to each actuator of the pair. If the actuators get out of synchronization, an increased pressure in one line triggers the cross-over relief valve to open a line to the other actuator, thereby diverting fluid away from the actuator that has finished its stroke to the actuator that is still completing its stroke. The flow divider/combiner operates in the same manner to synchronize the actuators on the return stroke when fluid from both actuators is combined on one line.

11 Claims, 3 Drawing Sheets

5,806,911

TRUCK COVER ASSEMBLY HAVING FLOW DIVIDER/COMBINER HYDRAULIC CIRCUIT

BACKGROUND OF THE INVENTION

Truck cover assemblies are used to prevent material from escaping from open truck bodies, such as dump trucks or trucks carrying roll-off containers. Generally, these assemblies comprise a pair of telescoping arms which are pivotally attached at their lower ends to a frame of the truck body. An edge of a cover is attached to the upper ends of the arms. As the arms are pivoted from the front toward the rear of the truck, they draw the cover over the truck body. The length of the arms can be adjusted during the pivoting motion to flatten the arc traversed by the drawn edge of the cover. The extension and retraction motion and the pivoting motion are controlled by hydraulic actuators. A disadvantage of this type of system is that, as the pair of arms pivot from front to rear or extend and retract, the hydraulic actuators can get out of synchronization. When one actuator reaches the end of its stroke before the other, increased pressure can force hydraulic fluid past sealing members such O-rings, potentially damaging the system.

BRIEF SUMMARY OF THE INVENTION

The present invention provides a hydraulic circuit for a truck cover assembly having a flow divider/combiner which puts pairs of hydraulic actuators back into synchronization. The cover assembly includes a flexible cover which is retained for extension and retraction at one end of the truck body. A pair of pivotable and extendible arms is mounted to a free end of the cover to draw the cover over the body. A pair of first hydraulic actuators is mounted to the arms to cause the arms to pivot about their attachment points. A pair of second hydraulic actuators is mounted to the arms to cause the arms to extend and retract.

A hydraulic circuit for operating the arms includes a three-position, four-way valve for each pair of actuators. In a first position, the valve allows hydraulic fluid to flow to each actuator of the pair through a flow divider/combiner. The flow divider/combiner includes a cross-over pressure relief valve and a divider/combiner section. The divider/combiner section divides the flow generally equally on lines to each actuator of the pair. If the actuators get out of synchronization, an increased pressure in one line triggers the cross-over relief valve to open a line to the other actuator, thereby diverting fluid away from the actuator that has finished its stroke to the actuator that is still completing its stroke.

BRIEF DESCRIPTION OF THE SEVERAL VIEWS OF THE DRAWING

The invention will be more fully understood from the following detailed description taken in conjunction with the accompanying drawings in which.

DETAILED DESCRIPTION OF THE INVENTION

Figure 1:
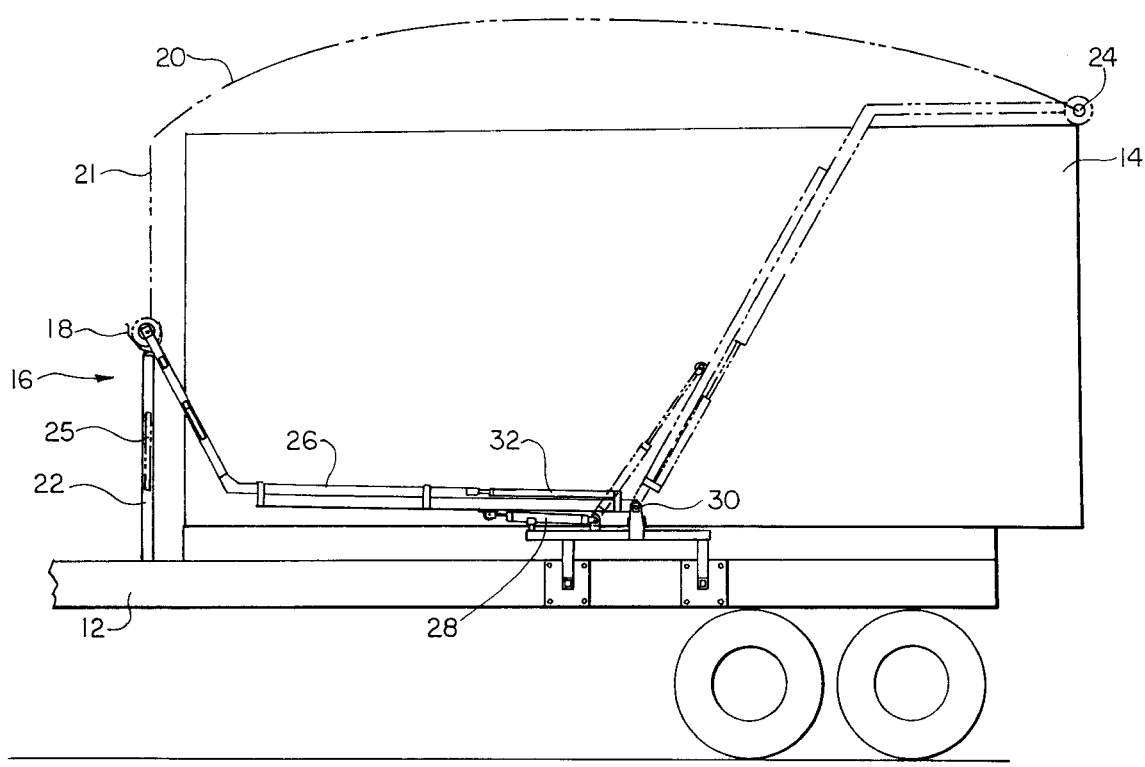
FIG. 1 is a partial side view of a truck body incorporating a truck cover assembly operable by a hydraulic system according to the present invention.

FIG. 1 illustrates a truck frame 12 having an upwardly open truck body, trailer, or roll-off container 14 which is coverable by a cover mechanism 16. The cover mechanism includes a cover housing 18 and a flexible cover 20, indicated in phantom, of sufficient size to cover the open body 14 in a fully extended position. The cover 20 is contained within the cover housing 18 in, for example, a rolled condition when the cover is retracted. The cover housing 18 is supported by a gantry 22 mounted to the truck frame 12, typically at the front of the body. The gantry 22 is operable by a hydraulic actuator 25 to raise and lower the cover housing 18 to the appropriate height, indicated by a phantom line 21, to allow the cover 20 to be extended over the body 14.

Figure 4:
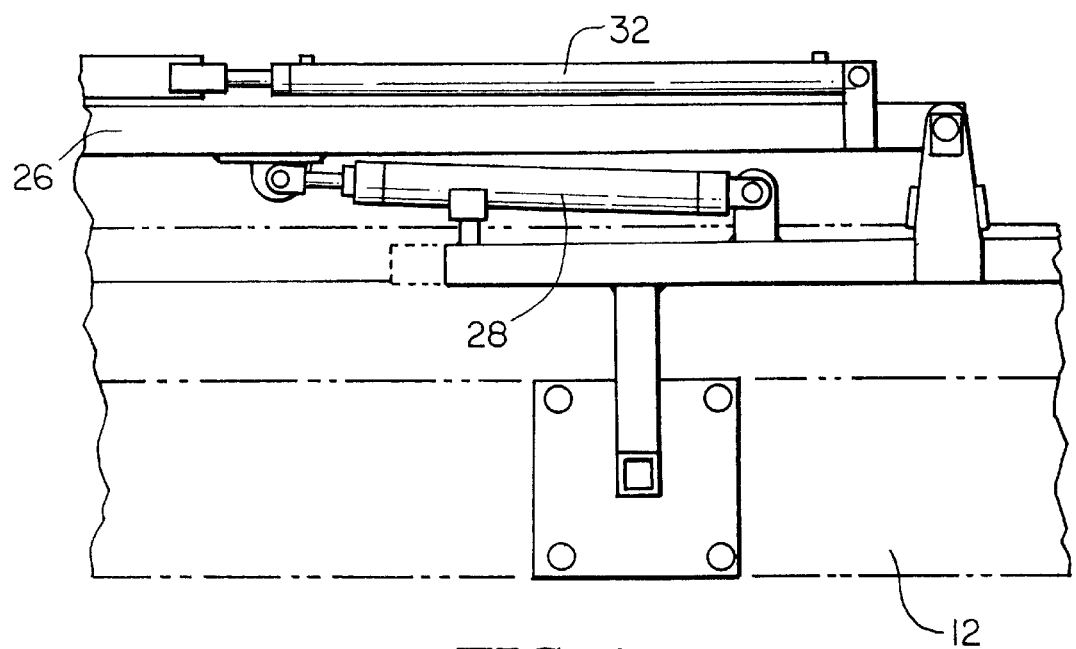
FIG. 4 is a partial side view of the hydraulic actuators of the system of FIG. 1.

A pair of arms 26 (only one of which is shown in FIG. 1) is pivotally mounted, one arm on each side of the truck, to the truck frame 12. Upper ends 24 of the pivotable arms are attached to the free end of the truck cover 20 to pull the cover over the body. The pivotable arms 26 are typically also telescopable to extend and retract. A pair of first hydraulic actuators 28 (further illustrated in FIG. 4) is mounted to the arms 26 to cause the arms to pivot about their attachment points 30. A pair of second hydraulic actuators 32 (further illustrated in FIG. 4) is mounted to the arms 26 to cause the upper ends to extend or retract. By extending or retracting the pivotable arms 26 during travel of the cover over the body, the cover can be maintained relatively level. The cover mechanism illustrated in FIGS. 1 and 4 is described with more particularity in copending U.S. patent application Ser. No. 08/675,573, filed on Jul. 3, 1996, the disclosure of which is incorporated herein by reference.

Figure 2:
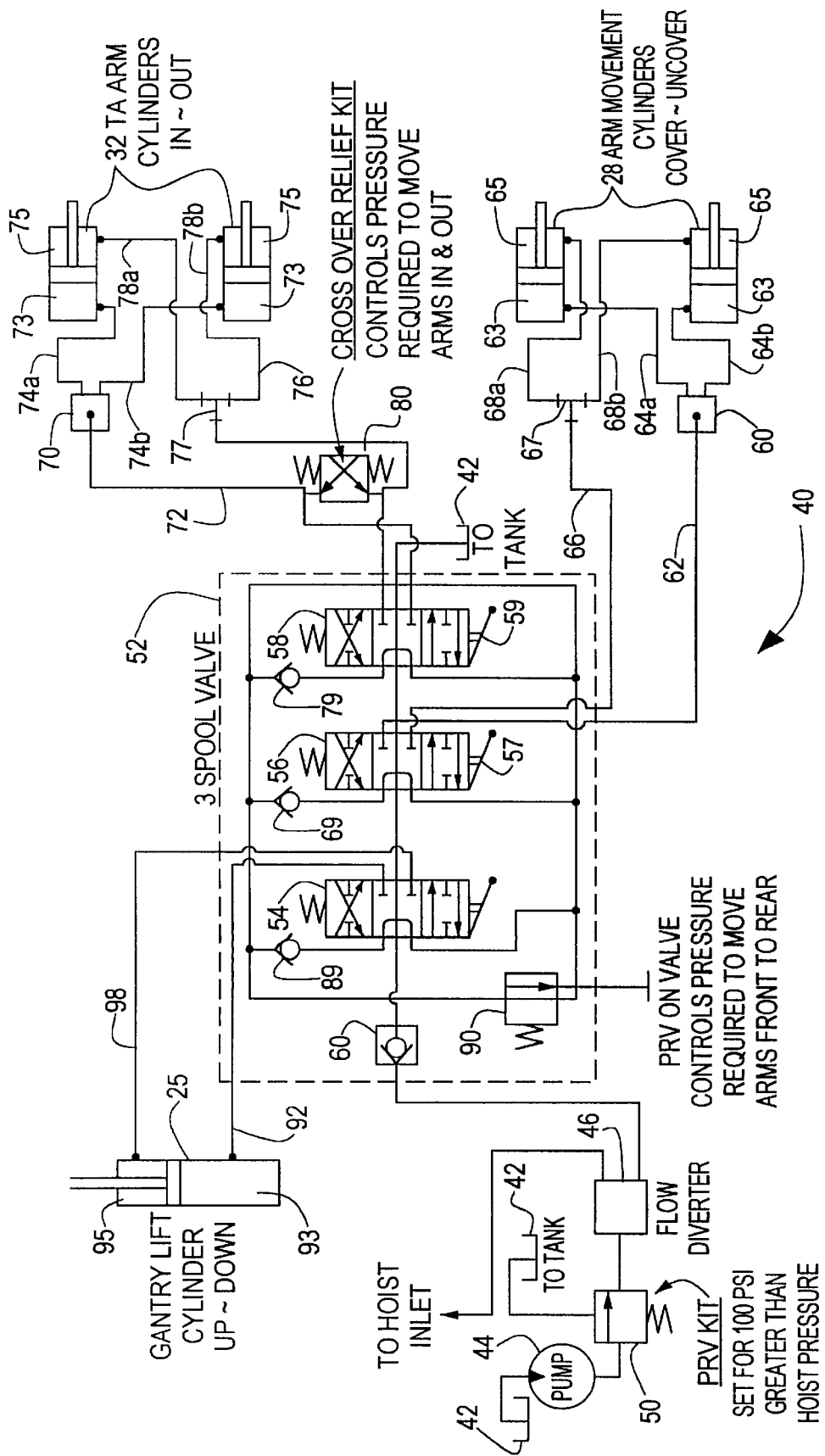
FIG. 2 is a schematic diagram of a hydraulic system according to the present invention.
Figure 3:
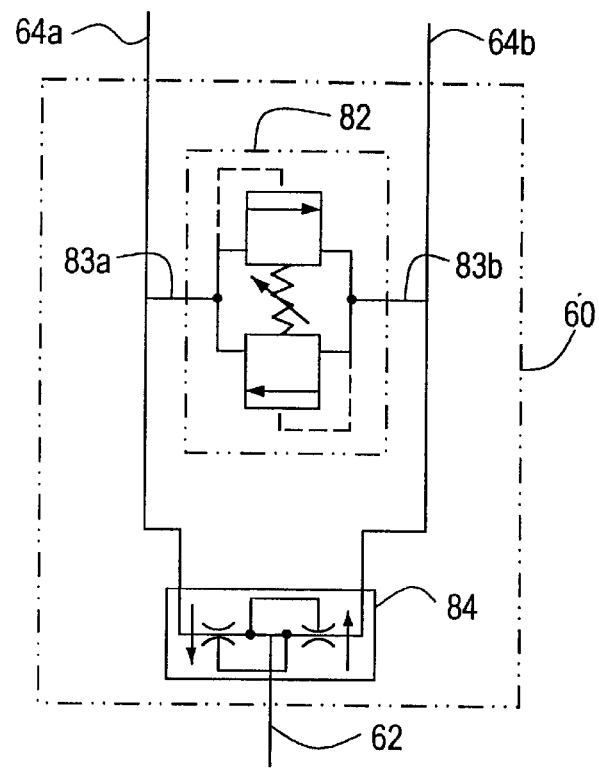
FIG. 3 is a schematic diagram of a flow divider/combiner of the hydraulic system of FIG. 2.

A hydraulic circuit 40 for operating the gantry and pivotable arms is illustrated in FIGS. 2 and 3. Hydraulic fluid is stored in a tank 42. A pump 44 is provided to deliver fluid in the tank 42 to the lines to the various actuators. A flow diverter 46 is provided to draw fluid from the truck's existing hydraulic system to the cover mechanism hydraulic circuit 40. A pressure relief valve 50 is provided if the pressure exceeds a predetermined value, typically set at 100 psi greater than the hoist pressure. The line from the flow diverter delivers fluid to a three spool valve 52, comprising a bank of three three-position, four-way valves 54, 56, 58. Such three spool valves are widely commercially available. A check valve 60 prevents undesired back flow of fluid. The first valve 54 controls delivery of fluid to the gantry actuator 25. The second valve 56 controls delivery of fluid to the cover/uncover actuators 28, which cause the arms 26 to pivot. The third valve 58 controls delivery of fluid to the extension/retraction actuators 32, which cause the arms 26 to extend or retract. The valves can be operated manually by an operator using, for example, a lever or by an automatic controller.

The second valve 56 for the cover/uncover actuators 28 is operable by a lever 57 or other suitable mechanism to move the valve into a first position which causes hydraulic fluid to flow through a line 62 to the lower chamber 63 of each actuator 28. A flow divider/combiner 60, discussed more fully below, diverts fluid on lines 64a, 64b to each actuator 28. A check valve 69 prevents undesired back flow of the fluid. A pressure relief valve 90 controls the pressure required to move the arms. Fluid in the upper chambers 65 of the actuators returns through the lines 68a, 68b, T junction 67, and line 66 to the tank. In this manner, the arm actuators 28 are extended, thereby pivoting the arms 26 to cover the truck body. Moving the valve 56 into a second position causes the hydraulic fluid to flow through the lines 66, T junction 67, and lines 68a, 68b to the upper chambers 65, thereby retracting the actuators and uncovering the truck body. Fluid in the lower chambers 63, of the actuators returns through the lines 64a, 64b, flow divider/combiner 60, and line 62 to the tank. In the middle position between the first and second positions, fluid is directed to the tank. Upon completion of a stroke by both actuators, the valve is returned to the middle position.

The third valve 58 for the extension/retraction actuators 32 is operable by a lever 59 or other suitable mechanism to move the valve into a first position which causes hydraulic fluid to flow through a line 72 to the lower chamber 73 of each actuator 32. A flow divider/combiner 70, identical to the flow divider/combiner 60 discussed more fully below, diverts the fluid on lines 74a, 74b to each actuator. A check valve 79 prevents undesired back flow of the fluid. A cross over relief valve 80 controls the pressure required to move the arms in and out. Fluid in the upper chambers 75 returns through the lines 78a, 78b, T junction 77, and line 76. In this manner, the arm actuators 32 are extended, thereby causing the arms 26 to telescope. Moving the valve 58 into a second position causes the hydraulic fluid to flow through the lines 76, T junction 77, and lines 78a, 78b to the upper chambers 75, thereby retracting the actuators 32 and the telescoping arms 26. Fluid in the lower chambers 73 returns through lines 74a, 74b, flow divider/combiner 70, and line 72 to the tank. In the middle position between the first and second positions, fluid is directed to the tank. Upon completion of a stroke by both actuators, the valve is returned to the middle position.

The flow divider/combiner 60 is illustrated in FIG. 3. The divider/combiner includes a cross-over pressure relief valve 82 and a divider/combiner section 84. The divider/combiner section divides the flow generally equally on lines 64a, 64b to each actuator of the pair of actuators. However, the accuracy and repeatability of the divider/combiner is approximately 4% of the flow. Thus, the actuators can get out of synchronization. If one actuator reaches the end of its stroke before the other actuator, the pressure in its line increases, triggering the cross-over relief valve 82 to open a line 83a or 83b to the other actuator, thereby diverting the fluid away from the actuator that has finished its stroke to the actuator that is still completing its stroke. The divider/combiner operates in the same manner to combine the flow when fluid is returning on lines 64a, 64b, to the tank. Thus, if one actuator reaches the end of its stroke before the other actuator, the pressure in its line increases, triggering the cross-over relief valve 82 to open a line 83a or 83b to the divider/combiner section 84 via the other line 64a or 64b.

The embodiment shown includes a gantry. The gantry valve 54 is operable by a lever or other suitable mechanism to move the valve into a first position which causes the hydraulic fluid to flow through a line 92 to the lower chamber 93 of the gantry actuator. Fluid in the upper chamber 95 returns through the line 98. In this manner, the gantry actuator is extended. Moving the valve into a second position causes the hydraulic fluid to flow through the line 98 to the upper chamber 95, while fluid in the lower chamber 93 flows back through the line 92. A check valve 89 prevents undesired bleed back of the fluid. In the middle position between the first and second positions, fluid is directed to the tank.

Other arm configurations are possible, and the present invention can be used with such other configurations. In some configurations, the arms which pivot to cover and uncover the truck body do not also extend and retract. In this case, only one flow divider/combiner associated with the cover/uncover actuators is provided. Similarly, the gantry is not required in the present invention.

The invention is not to be limited by what has been particularly shown and described, except as indicated by the appended claims.

I claim:

1. An apparatus for drawing a flexible cover over an upwardly open container body having an upper edge, the apparatus comprising:
   a flexible cover of a size to substantially cover the open container body and fixed at one end of the container body by a cover support for retraction and extension over the open container body;
   a pair of arms each pivotally mounted at a fixed end to the container body, and each having a free end opposite the fixed end attached to an edge of the flexible cover and configured such that movement of the arms causes movement of the cover over the open container body; and
   a hydraulic circuit comprising:
      a pair of extensible and retractable hydraulic actuators each connected to an associated pivotable arm to cause movement of the arm;
      a flow divider/combiner assembly in fluid communication with each hydraulic actuator and operable during extension and retraction of the hydraulic actuators to maintain synchronized movement of each actuator.

2. The apparatus of claim 1, wherein the pair of hydraulic actuators are connected to the associated pivotable arms to cause the arms to pivot about the fixed ends.

3. The apparatus of claim 1, wherein the flow divider/combiner assembly includes a cross-over relief valve in fluid communication with a fluid line to each actuator, the cross-over relief valve operative to open a fluid path from one line to another line when one actuator reaches an end of its stroke.

4. The apparatus of claim 3, wherein the flow divider/combiner assembly includes a divider combiner section upstream of the cross-over relief valve and operative to divert fluid to each actuator and to combine fluid on a return line.

5. The apparatus of claim 1, wherein the hydraulic circuit further comprises a three-position, four-way valve in fluid communication with the pair of hydraulic actuators to cause actuation of the hydraulic actuators.

6. An apparatus for drawing a flexible cover over an upwardly open container body having an upper edge, the apparatus comprising:
   a flexible cover of a size to substantially cover the open container body and fixed at one end of the container body by a cover support for retraction and extension over the open container body;
   a pair of telescopic arms each pivotally mounted at a fixed end to the container body, and each having a free end opposite the fixed end attached to an edge of the flexible cover and configured such that movement of the arms causes movement of the cover over the open container body; and
   a hydraulic circuit comprising:
      a pair of extensible and retractable hydraulic actuators each connected to an associated telescopic arm to cause movement of the arm;

a flow divider/combiner assembly in fluid communication with each hydraulic actuator and operable during extension and retraction of the hydraulic actuators to maintain synchronized movement of each actuator.

7. The apparatus of claim 6, wherein the pair of hydraulic actuators are connected to the associated telescopic arms to cause the arms to extend and retract.

8. The apparatus of claim 6, wherein the pair of hydraulic actuators are connected to the associated telescopic arms to cause the arms to pivot about the fixed ends.

9. The apparatus of claim 6, wherein the flow divider/combiner assembly includes a cross-over relief valve in fluid communication with a fluid line to each actuator, the cross-over relief valve operative to open a fluid path from one line to another line when one actuator reaches an end of its stroke.

10. The apparatus of claim 9, wherein the flow divider/combiner assembly includes a divider combiner section upstream of the cross-over relief valve and operative to divert fluid to each actuator and combine fluid on a return line.

11. The apparatus of claim 6, wherein the hydraulic circuit further comprises a three-position, four-way valve in fluid communication with the pair of hydraulic actuators to cause actuation of the hydraulic actuators.

* * * * *